United States Patent [19]

Kozyrski

[11] Patent Number: 4,773,165
[45] Date of Patent: Sep. 27, 1988

[54] ANGLE MAT GUIDE

[75] Inventor: Vincent T. Kozyrski, Plainville, Conn.

[73] Assignee: The Fletcher-Terry Company, Farmington, Conn.

[21] Appl. No.: 109,749

[22] Filed: Oct. 19, 1987

[51] Int. Cl.$^4$ .............................................. G01B 3/38
[52] U.S. Cl. ...................... 33/613; 33/1 N;
    33/153 E; 33/422; 33/534; 33/452; 33/471
[58] Field of Search ............... 33/534, 1 N, 415, 452,
    33/471, 422, 153 E, 153 R, 424, 465, 149 R, 153
    B, 148 R, 148 E, 626, 613

[56] References Cited

U.S. PATENT DOCUMENTS

| | | |
|---|---|---|
| 335,293 | 2/1886 | McKinney . |
| 422,852 | 3/1890 | Traut . |
| 964,246 | 7/1910 | Hagan, Sr. . |
| 1,032,493 | 7/1912 | Myers . |
| 1,255,850 | 2/1918 | Beaulieu . |
| 1,409,342 | 3/1922 | Henrichs . |
| 1,730,852 | 10/1929 | Jenny . |
| 2,460,713 | 2/1949 | Richardson ................. 33/422 X |
| 2,504,244 | 4/1950 | Barclay . |
| 2,575,697 | 11/1951 | Willis . |
| 2,651,844 | 9/1953 | Smith ................................ 33/471 |
| 2,832,144 | 4/1958 | Dargue . |
| 3,934,350 | 1/1976 | Pirnie . |
| 4,202,233 | 5/1980 | Larson ................................ 83/745 |
| 4,535,542 | 8/1985 | Liu et al. ........................ 33/452 X |
| 4,734,992 | 4/1988 | Scott ............................... 33/153 E |

FOREIGN PATENT DOCUMENTS 127534   1/1902   Fed. Rep. of Germany .... 33/153 E

OTHER PUBLICATIONS

Publication entitled "Carithers Mat Protractor"–(8 pp.) by Carithers International Associates, Inc., Jackson, Miss., (Date Unknown).
Publication entitled "Model CHN 4060A" (1 p.) by Carithers International Associates, Inc., Jackson, Miss., (Date Unknown).

Primary Examiner—William D. Martin, Jr.
Attorney, Agent, or Firm—Ira S. Dorman

[57] ABSTRACT

An angle guide device has a pair of arm members which are adjustable through a range of angles to engage adjacent edges at the corner of a piece of mat board. The device is adapted for mounting upon a triangular guide member in a mat cutting machine, and to be secured in each of a multiplicity of positions along the length of the guide member.

16 Claims, 2 Drawing Sheets

ANGLE MAT GUIDE

BACKGROUND OF THE INVENTION

Machines for cutting mat board, such as is used in picture framing and the like, are well known in the art and are in widespread use. A particularly desirable machine of this kind is commercially available from The Fletcher-Terry Company, of Farmington, Conn., and is described in copending application for U.S. Pat. Ser. No. 07/013,578, entitled "Mat Bevel Cutting Machine", filed on Feb. 11, 1987 in the names of Kozyrski et al, and of common assignment herewith.

Mat board cutting machines typically consist of a base and a pivotably attached handled assembly, which in turn slideably mounts a cutting head and carries a clamping bar. The machine is used simply by placing the piece of mat board to be cut upon the surface of the base, and lowering the handle assembly upon it; this serves both to position the head for cutting, and also to hold the workpiece in place under the clamping bar.

It is conventional for such a machine to have straight-edge features for positioning the workpiece relative to the cutting axis, and at minimum a guide edge will normally be provided which is parallel to the travel path of the cutting head. Devices are however also available for positioning the mat in other orientations.

Although in most instances mats cut for picture framing will be rectangular, and formed with parallel-sided rectangular sight openings, in many cases it will be desirable to cut the mat with a non-rectangular exterior configuration and/or with a non-rectangular polygonal sight opening, which may or may not be oriented to provide internal and external edges that are parallel to one another. To perform the cutting operations necessary to produce such shapes, with optimal accuracy and facility, the machine will most advantageously employ a device that is capable of engaging a corner of the mat, and of positioning it in each of a range of angular orientations relative to a reference line (i.e., the travel path of the cutting head).

So-called "multi-angle" mat guides, providing such capabilities, have heretofore been offered commercially. They are often found however to afford less accuracy and convenience of use than may be desired, and to be of unduly complex design and construction.

Accordingly, it is the broad object of the present invention to provide a novel angle mat guide device for engaging an edge of a workpiece to effect positioning thereof, which device will afford a high degree of accuracy and convenience in use, and is of relatively uncomplicated and inexpensive design and construction.

It is a more specific object of the invention to provide such a device by which both adjacent edges at a corner of the workpiece can be engaged simultaneously, to thereby provide the utmost accuracy, reproducibility and facility in carrying out the cutting operations.

Another specific object is to provide a novel device having the foregoing features and advantages, which is adapted for mounting upon a guide member, particularly one having a portion of generally triangular configuration, and for facile securement at each of a multiplicity of positions along the length thereof.

SUMMARY OF THE INVENTION

It has now been found that certain of the foregoing and related objects of the invention are attained by the provision of a device comprised of a body and a pair of arm members assembled therewith. The body of the device has a generally planar bottom surface portion, and a lateral marginal portion with an edge surface thereon. It also has a channel of semicircular configuration formed into it; the channel is disposed in a plane substantially parallel to the bottom surface portion, and has opposite ends opening on the edge surface of the marginal portion of the body. Each of the arm members is comprised of a semicircular mounting part and an abutment part having a planar contact surface portion thereon, the abutment part being joined to the associated mounting part adjacent of its one ends, with the contact surface portion of the abutment part opposed to the mounting part and extending generally radially with respect to it. The mounting parts of the arm members are dimensioned and configured for independent, sliding movement, superimposed and seated within the channel of the body, and the arm members are assembled with the body with the mounting parts so seated and with the abutment parts disposed outwardly of the marginal portion of the body and extending in generally opposite directions from it. The device also includes means for disengageably affixing the seated mounting parts in each of a multiplicity of positions relative to one another and to the body, so that the abutment parts can be affixed in a range of angular relationships to one another, and to the body.

In the preferred embodiments of the device, a single form of mounting part will be employed for both of the arm members, with the two parts disposed in the body channel in an inverted relationship to one another. The portion at the "one" end of the mounting part will advantageously be of enlarged cross section, transverse to its length and relative to the transverse cross section of the remaining portion of the part, which remaining portion will be of substantially uniform external transverse cross-sectional configuration.

In most instances an end portion of the mounting part, spaced from the "one" end, will have a slot formed through it and extending arcuately therealong, and the slots of the superimposed mounting parts will be in registry with one another, along at least a portion of their lengths. The affixing means used will comprise a fastener having a first portion extending through the slots and engaged within the body, and a second portion overlying the outermost of the two mounting parts and adapted to clamp them both against the body.

In addition, the mounting parts will advantageously be provided with angle-designating scales, which cooperate with indicator elements on the body, adjacent the channel, to indicate the angular positions of the contact surfaces of the abutment parts, relative to a reference axis of the body. Normally, the channel will open upwardly along its length, through a top portion of the body, and an arcuate lip element will desirably be provided thereon along one side of the channel and extending partially thereover, the lip element thereby serving to help retain the mounting parts of the arm members within the channel.

In especially preferred embodiments the body will have at least one depending flange element, disposed along its marginal portion, which projects downwardly beyond the bottom surface portion and provides a contiguous interior surface. The device will thereby be adapted for use in assembly with a guide member having a flat top surface and a rectilinear edge surface extending along one of its margins. In assembly, the bottom surface portion of the body, and the interior surface of the flange element, will ride upon the top and edge surfaces, respectively, of the guide member.

The device will preferably also include a locking piece to adapt it for securement in selected positions on the guide member. The locking piece extends transversely through, and is rotatably mounted within, the body, and it has a lug element that projects downwardly beyond the bottom surface of the body and is disposed eccentrically with respect to the axis of rotation. To secure the device on the guide member, the locking piece is turned to bring its lug element into tight engagement upon an edge surface of the member, thereby clamping the flange element against the opposite edge.

In such embodiments the body will most desirably have a plurality of circular apertures, of substantially the same diameter, that extend transversely through it and are spaced laterally, by different distances, from the flange element, and the locking piece employed will be a peg, the latter having a circular shaft portion (from which the lug element projects) of substantially the same diameter as the apertures. This will enable the device to be secured in each of a multiplicity of positions along the length of a tapered guide member, or of several guide members of different widths, by seating the peg in a selected one of the apertures and then turning it to bring the lug element into tight engagement upon the underlying, registered edge surface. The body of the device will usually have a second such flange element spaced along the marginal portion from the first, and the apertures may be disposed on at least one axis that is perpendicular to the axis connecting the flange elements, and that is located between them. This will afford three-point contact of the flange elements and locking peg on the guide member, to securely affix the device in each position therealong.

Other objects of the invention are attained by the provision of an assembly comprising an angle guide device, a locking piece, and a guide member, each as hereinbefore and hereinafter set forth and described.

DETAILED DESCRIPTION OF THE ILLUSTRATED EMBODIMENT

Figure 1:
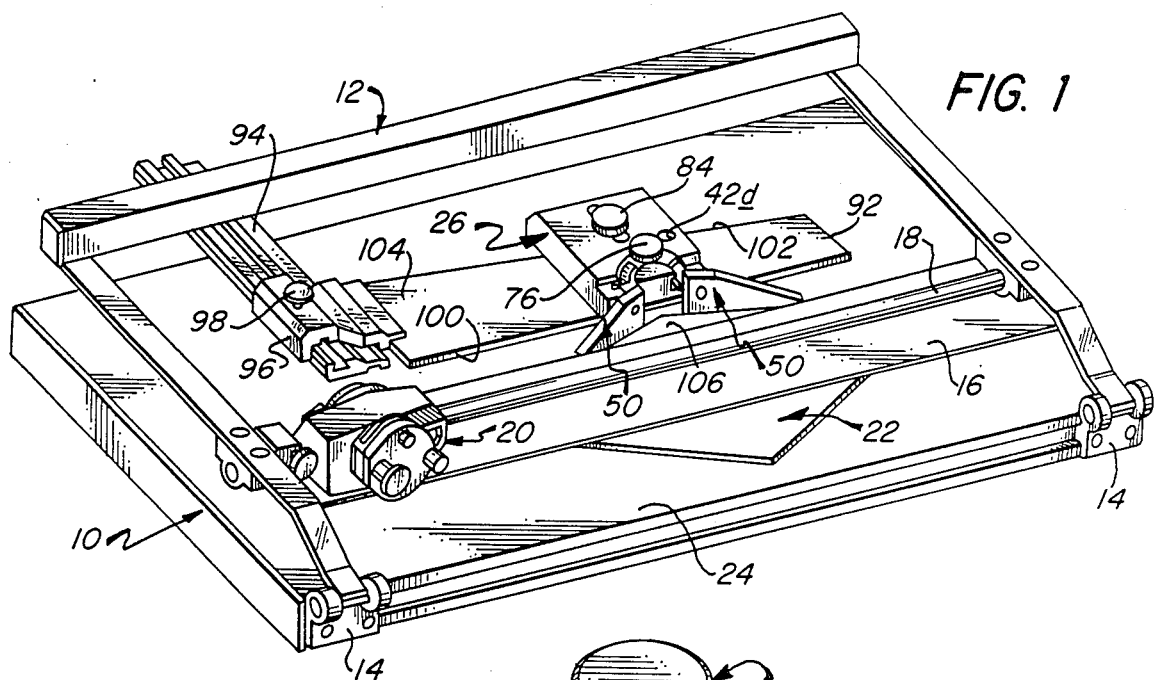
FIG. 1 is a perspective view showing a mat bevel cutting machine in which is installed the angle mat guide device of the present invention.
Figure 2:
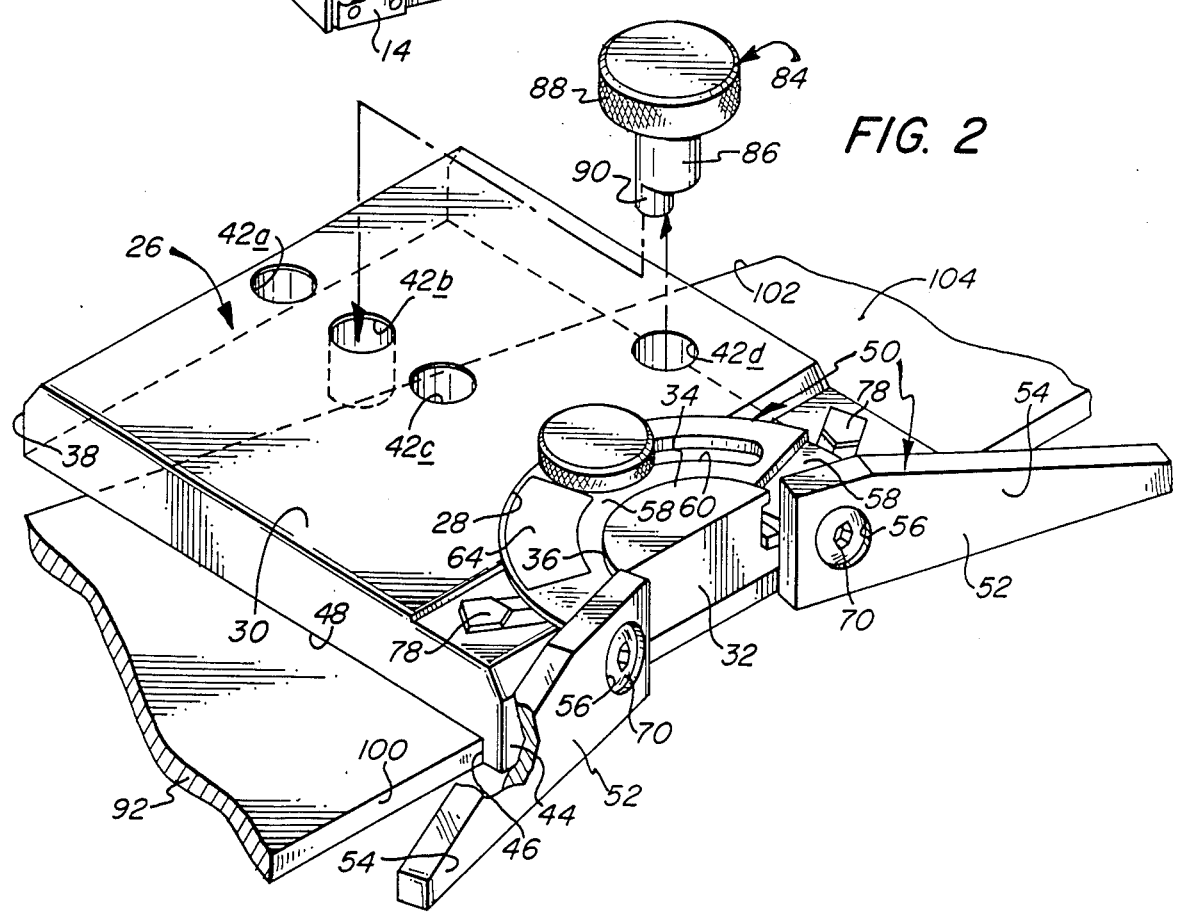
FIG. 2 is a perspective view of the angle mat guide device of FIG. 1, drawn to an enlarged scale, the locking peg employed therewith being shown removed from the body of the device and the edge guide plate on which it is mounted being fragmentarily illustrated.
Figure 3:
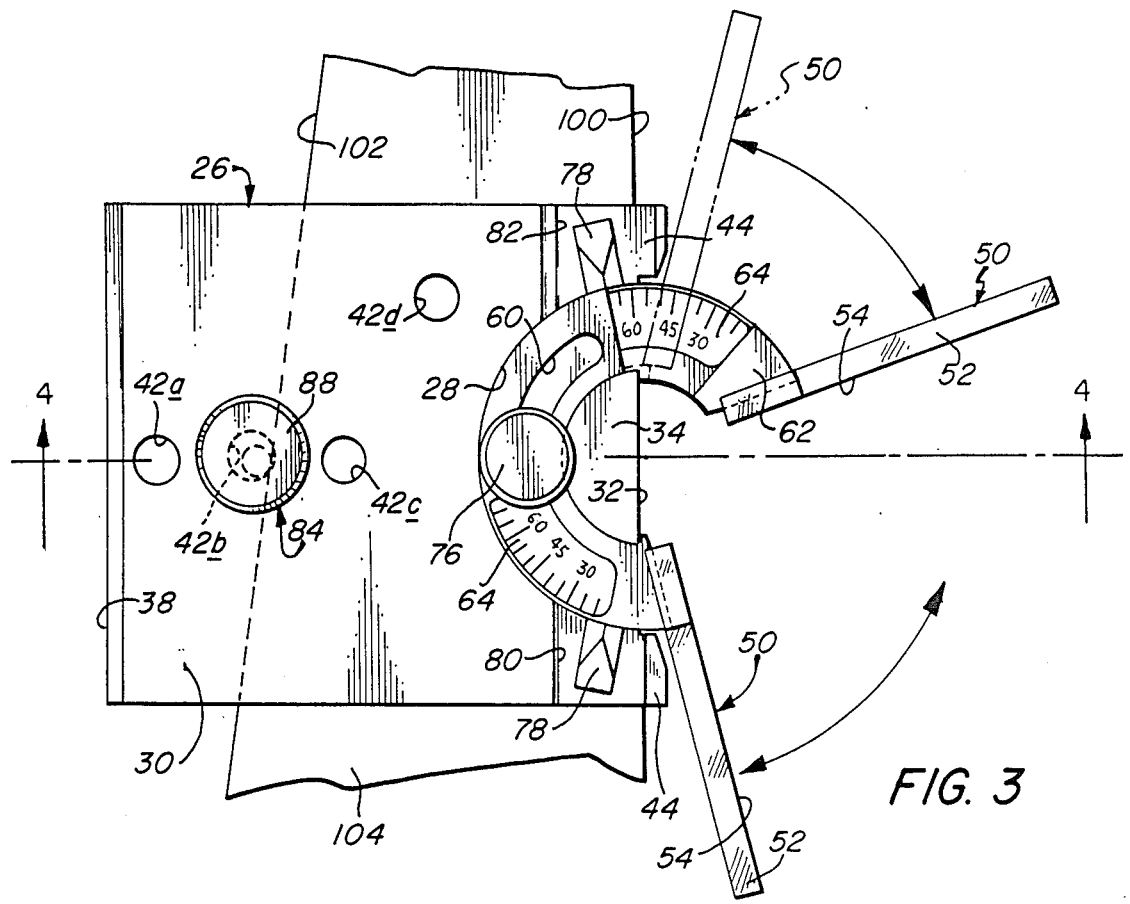
FIG. 3 is a plan view of the assembly of FIG. 2, showing the locking peg in position in one of the apertures of the body of the guide device, and showing (in full line and phantom line) alternative positions of one of the arm members.

The machine in which the angle mat guide of the invention is employed may take any of numerous different forms, one of which is depicted in FIG. 1 for illustrative purposes. Although more fully described in the above-identified Kozyrski et al application, for present purposes it is sufficient to note that the machine consists of a base, generally designated by the numeral 10, and a handle assembly which is generally designated by the numeral 12 and is attached by a pair of hinges 14. The handle assembly 12 pivotably supports a rail 18, to which is affixed the clamping bar 16; the rail 18 in turn slideably mounts a cutting head trolley, generally designated by the numeral 20. As will be appreciated, when the handle assembly is disposed for cutting (i.e., lowered to the position of FIG. 1), the clamping bar 16 rests upon the workpiece, depicted as a piece 22 of cardboard mat of the kind typically used for framing of pictures and the like, thereby serving to hold it securely in position against the top surface 24 of the machine base 10.

The angle guide device of the invention is illustrated in detail in FIGS. 2-5, and consists of a flat, plate-like body, generally designated by the numeral 26. A semicircular groove 28 is formed downwardly from the top surface 30 of the body 26, and opens at its opposite ends at the forward lateral edge 32. A semicircular hub portion 34 is defined on the body adjacent the groove 28, and it provides a narrow lip element 36 projecting thereover from its curvilinear inner edge. A tapped hole 40 extends through the lower portion of the body 26, and is aligned within the channel 28 on a central axis extending between the forward edge 32 and the rearward edge 38 thereof. Three identical, cylindrical apertures 42a, 42b and 42c are also formed through the body 26, at equidistantly spaced locations on the same central axis, and a fourth identical aperture 42d is disposed closest to the forward edge 32 and in a position upwardly offset from the axis of the others.

Two flange elements or fingers 44 extend downwardly from along the forward lateral edge 32 of the body, to project somewhat beyond the bottom surface 48. As can be seen, the bottom surface 48 is flat and smooth, as are the inside surfaces 46 of the two fingers 44. Thus, they cooperatively provide a discontinuous, right-angle internal shoulder along the lower forward edge of the body 26.

Assembled with the body are two arm members, each of which is generally designated by the numeral 50 and consists of a thin, straight arm 52, having a flat contact surface 54 on one side, and a semicircular mounting piece 58 attached to the arm 52 on the side thereof opposite to the surface 54. An arcuate slot 60 extends through and along the mounting piece 58 adjacent one end. Secured to the surface of the mounting piece, between the slot 60 and the enlargement 62, is a label 64, on which is printed a scale of angle degrees. A groove 66, formed into the back surface of each arm 52, is dimensioned and configured to seat the enlargement 62, which is disposed endwise against the recessed surface thereof, and a small, threaded bore 68 extends into the enlargement and receives a small cap screw 70, inserted through the aperture 56 in the upper corner of the arm 52; in this manner, the arm is rigidly affixed to the mounting piece 58.

Figure 4:
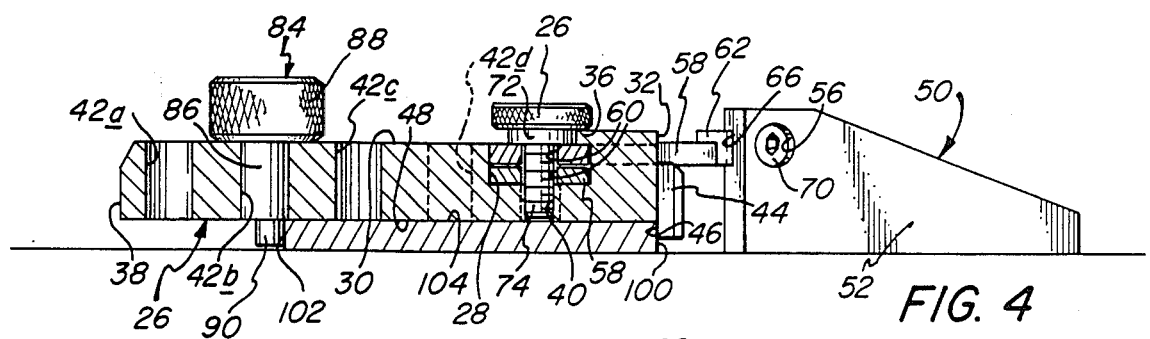
FIG. 4 is a sectional view of the assembly, taken along line 4—4 of FIG. 3.
Figure 5:
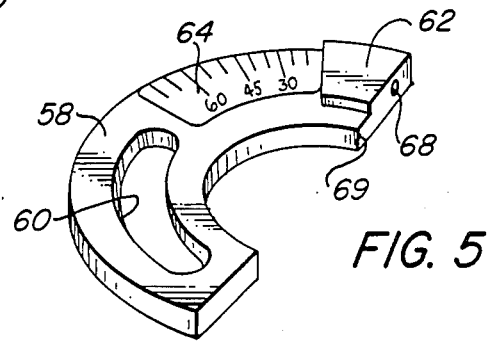
FIG. 5 is a perspective view of the semicircular mounting part of which each of the arm members is comprised.

It should be noted that the mounting pieces 58 of the two arm members 52 are identical, but that they are affixed to their respective arms 50 in an inverted relationship to one another. The slots 66 and apertures 56 in the arms will of course be located at appropriate positions to accommodate the slight difference in the levels at which the mounting pieces 58 must be attached to enable their superimposed assembly within the guide body channel 28, as is best seen in FIG. 4.

It will also be noted that the mounting pieces 58 are engaged under the inwardly extending lip element 36 on the semicircular hub portion 32, and that they are secured within the channel by a clamping screw 72, the screw having a shaft 74 with a threaded end portion engaged within the tapped hole 40, and a knurled knob 76 at the top. The shaft 74 extends through the aligned arcuate slots 60 of the two mounting pieces, each of which can therefore be moved through the limit of its slot. The single clamping screw 72 serves to simultaneously secure both of the arm members 50 in any selected position, thereby enabling a range of orientations and relationships to be achieved with respect to one another and the body 26.

A pair of indicator bosses 78 are formed on the top surface of the body 26, within the recessed shoulder areas 80, 82 thereof, and they are disposed directly adjacent the semicircular channel 28, to cooperate with the scales on the labels 64 for facile and accurate selection of any desired position of the arm members 50 throughout their arc of movement. It will be appreciated that the labels 64 are positioned on the mounting pieces 58 so that the angular indicia thereon correlate to the flat contact surfaces 54 on the arms 52, and serve to properly orient those surfaces when the indicia are brought into registry with the centrally disposed straight-edge element on the corresponding indicator boss 78.

The angle guide device also includes a locking peg, generally designated by the numeral 84, consisting of a cylindrical shaft portion 86 having a coaxial knurled knob portion 88 at one end, and a small cylindrical lug element at the opposite end disposed in an eccentric relationship to the axis of the shaft portion 86. As can be seen in FIG. 4, the length of the shaft portion 86 is the same as the thickness of the body 26; thus, when the locking peg 84 is seated in one of the apertures 42 of the body the lug element 90 projects beyond the bottom surface 48 thereof.

The angle guide device is employed, in accordance with the illustrated embodiment, by mounting it upon the edge guide plate 92 of a squaring guide assembly associated with the cutting machine. More particularly, and as seen in FIG. 1, the squaring guide assembly is mounted upon a longitudinally slotted bar 94, which is in turn affixed on the top surface 24 of the machine base 10; it is disposed in a perpendicular orientation to the trolley rail 18 on the handle assembly 12. The guide plate 92 is attached at its lower edge to a flange portion of a slider body 96, by which the assembly is mounted on the bar 94 for rectilinear movement along the length thereof. A clamping mechanism is provided on the slider body 96, and includes a wedge element (not shown) threadably engaged on the lower end of a screw 98, the screw serving to elevate the wedge element within the slot (which has a corresponding cross section of upwardly diminishing dimensions) and thereby to secure the body 96 at any point along the length of the bar 94. In this manner the spacing of the guide plate 92 from the cutting mechanism is readily established and fixed.

The edge guide plate 92 is of truncated, right-triangular configuration, and has rectilinear forward and rearward lateral edges 100 and 102, respectively. The relationship in which the guide plate is assembled with the slider body 96 will normally be such that the forward edge 100 will lie in precise parallelism to the rail 18, so as to permit the cutting of true edges on the workpiece.

In assembly with the angle guide device, the forward edge 100 of the plate 92 abuts against the spaced inside surface elements 46 of the depending finger elements 44 along the front edge of the body 26, while the surface 104 lies in face-to-face contact with the bottom surface 48 thereof. The apertures 42a-42c are so disposed that, when the forward edge 100 of the plate 92 is abutted against the finger elements 44, one of them will lie in approximate registration over the rear edge 102 regardless of the location of the body at any given point along the length of the plate 92. This enables use of the locking peg 84 to clamp the guide device in virtually any selected position on the plate. The aperture 42d permits use with a guide plate narrower than the one illustrated.

As can be seen from FIG. 4, the eccentric lug element 90 projects downwardly along the edge 102, and has been brought into tight engagement therewith by rotation of the peg 84, thereby securely clamping the plate 92 between the fingers 44 of the angle guide body 26 and the lug element 90 of the peg 84. The peg 84 will of course be removed and relocated in a different one of the apertures, as necessary to achieve clamping at locations displaced upwardly or downwardly from that shown.

FIG. 1 illustrates the device of the invention in use to properly position and orient a piece 22 of mat board for cutting. As can be seen, the workpiece has a corner 106, which is defined by intersecting edges disposed at a non-perpendicular angular relationship to one another. The arm members 50 are affixed in appropriate relative positions for embracing the corner 106, and also in such a relationship to an axis of the body 26 that the workpiece will be cut along the intended axis when the trolley 20 is moved across it.

As will be appreciated, the arm members can be adjusted to engage corners defined by edges lying in a range of angular relationships, from quite sharply acute to rather widely obtuse (including of course a right angular setting). Moreover, at any given disposition of the arms, relative to one another, the angular relationship to an axis of the body can be varied through a fairly wide range, depending of course upon the extent to which the arms are spread. Typically, each arm will be movable through a range of angles from 20° to 70°.

It will also be understood that construction of the device can vary considerably from that which is shown in the drawings, without departing from the concept of the invention. For example, although the depicted clamping arrangement is presently regarded to constitute the best mode for carrying out the invention, a continuous flange along the forward edge, and/or other modifications may be made, such as to accommodate variations in the guide member with which the device is intended for use, which may for example have parallel, rather than convergent, lateral edges.

Thus, it can be seen that the present invention provides a novel angle mat guide device for engaging an edge of a workpiece to effect positioning thereof, which device will afford a high degree of accuracy and convenience in use, and is of relatively uncomplicated and inexpensive design and construction. More specifically, both adjacent edges at a corner of the workpiece can be engaged by the device, to provide the utmost accuracy, reproducibility and facility in carrying out the cutting operations, and the device is adapted for assembly with a guide member, and particularly one having a portion of generally triangular configuration, on which it can readily be affixed at each of a multiplicity of positions along its length.

Having thus described the invention, what is claimed is:

1. A device for engaging the edge of a workpiece, such as a piece of mat board, to effect positioning thereof, comprising:

a body having a generally planar bottom surface portion and a lateral marginal portion with an edge surface thereon, and having a channel of semicircular configuration formed therein and disposed in a plane substantially parallel to said bottom surface portion, said channel having opposite ends opening on said edge surface of said marginal portion;

a pair of arm members, each comprised of a semicircular mounting part and an abutment part having a contact surface portion thereon, said abutment part of each of said arm members being joined to the associated mounting part adjacent one end of said mounting part, with said contact surface portion of said abutment part opposed to said mounting part and extending generally radially thereof, said mounting parts of said arm members being dimensioned and configured for independent, sliding movement in superimposed seated engagement within said channel of said body, said arm members being assembled with said body with said mounting parts so engaged, with said abutment parts disposed outwardly of said marginal portion of said body, and with said contact surface portions thereon extending generally radially and in opposite directions therefrom; and means for disengageably affixing said mounting parts in each of a multiplicity of angular positions relative to one another and to said body, whereby said abutment parts can be affixed in a multiplicity of angular relationships to one another and to said body.

2. The assembly of claim 1 wherein a single form of mounting part is employed for both of said arm members, said mounting parts being disposed in said body channel in an inverted relationship to one another.

3. The assembly of claim 2 wherein the portion of said mounting part at said one end thereof is of enlarged cross section, transverse to the length thereof, relative to the transverse cross section of the remaining portion of said part, said remaining portion having a substantially uniform external transverse cross-sectional configuration along its length.

4. The assembly of claim 2 wherein an end portion of said mounting part spaced from said one end has a slot therethrough extending arcuately therealong, said slots of said superimposed mounting parts being in registry with one another, along at least a portion of the lengths thereof; and wherein said affixing means comprises a fastener having a portion extending through said slots and engaged within said body, said fastener having an end portion overlying the outermost of said mounting parts and adapted to simultaneously clamp both of said mounting parts against said body.

5. The assembly of claim 1 wherein said contact surface portions on said abutment parts are planar, wherein said mounting parts have angle-designating scales thereon, and wherein said body has indicator elements thereon adjacent said channel, said scales and indicator elements being visible and so disposed as to cooperatively indicate the angular positions of said contact surfaces of said abutment parts relative to a reference axis of said body.

6. The assembly of claim 1 wherein said channel opens upwardly along its length through a top portion of said body.

7. The assembly of claim 6 wherein said top portion of said body includes an arcuate lip element along one side of said channel, said lip element extending partially thereover and thereby cooperating for the retention of said mounting parts of said arm members therewithin.

8. The device of claim 1 wherein said body has at least one depending flange element disposed along said marginal portion, said flange element projecting downwardly beyond said bottom surface portion and having an interior surface thereon contiguous thereto, said device being adapted for use in assembly with a guide member, which has a flat top surface and a rectilinear edge surface extending along one margin thereof, with said bottom surface portion of said body and said interior surface of said flange element riding upon the top and edge surfaces of the guide member, respectively, in such assembly.

9. The device of claim 8 additionally including a locking piece extending transversely through said body and rotatably mounted therein, said locking piece having a lug element projecting downwardly beyond said bottom surface and disposed eccentrically with respect to the axis of rotation thereof, said device thereby being adapted for securement in position on such a guide member by turning said locking piece to bring said lug element into tight engagement upon an edge surface spaced laterally from the first-mentioned rectilinear edge surface thereof, and thereby clamping said flange element thereagainst.

10. The device of claim 9 wherein said body has a plurality of circular apertures of substantially the same diameter extending transversely therethrough and spaced laterally, by different distances, from said flange element, and wherein said locking piece is a peg having a circular shaft portion, from which said lug element projects, of substantially the same diameter as said apertures for removably and rotatably seating said peg in each one thereof, said peg being so seated in one of said apertures and thereby adapting said device for use with such a guide member having a second rectilinear edge surface extending along an opposite margin thereof, and for securement in each of a multiplicity of positions along the guide member by turning said seated peg to bring said lug element into tight engagement upon the second edge surface thereof.

11. The device of claim 10 wherein said body has a second said flange element thereon and spaced along said marginal portion therefrom, and wherein said apertures are disposed on at least one axis perpendicular to the axis connecting said flange elements and located therebetween.

12. The device of claim 10 wherein said peg has a knob on the opposite end of said shaft from said lug element to facilitate turning thereof.

13. An assembly for positioning a workpiece, such as a piece of mat board, by engagement of an edge thereof, including:

an angle guide device comprising: (a) a body having a generally planar bottom surface portion and a lateral marginal portion with an edge surface thereon, and having a channel of semicircular configuration formed therein and disposed in a plane substantially parallel to said bottom surface portion, said channel having opposite ends opening on said edge surface of said marginal portion; (b) a pair of arm members, each comprised of a semicircular mounting part and an abutment part having a contact surface portion thereon, said abutment part of each of said arm members being joined to the associated mounting part adjacent one end of said mounting part, with said contact surface portion of said abutment part opposed to said mounting part and extending generally radially thereof, said mounting parts of said arm members being dimensioned and configured for independent, sliding movement in superimposed seated engagement within said channel of said body, said arm members being assembled with said body with said mounting parts so engaged, with said abutment parts disposed outwardly of said marginal portion of said body, and with said contact surface portions thereon extending generally radially and in opposite directions therefrom; and (c) means for disengageably affixing said mounting parts in each of a multiplicity of angular positions relative to one another and to said body, whereby said abutment parts can be affixed in a multiplicity of angular relationships to one another and to said body, said body having projecting means disposed along said marginal portion and projecting downwardly beyond said bottom surface portion, said projecting means providing a plurality of interior surface elements contiguous to said bottom surface portion and spaced from one another along said marginal portion, said body also having a plurality of substantially identical circular apertures extending transversely therethrough, between said surface elements, and spaced laterally different distances from said projecting means;

a locking piece removably seated in one of said apertures and extending transversely through said body and rotatably mounted therein, said locking piece having a lug element positioned eccentrically with respect to the axis of rotation thereof, and disposed adjacent said bottom surface and projecting downwardly therebeyond; and an elongated guide member having a flat top surface, and rectilinear edge surfaces extending along opposite lateral margins thereof, said device thereby being adapted for securement in each of a multiplicity of positions along the longitudinal axis of said guide member by turning said locking piece within said aperture to bring said lug element thereof into tight engagement upon one of said rectilinear edge surfaces, and to thereby clamp said projecting means against the other of said edge surfaces.

14. The assembly of claim 13 wherein said guide member is of generally right-triangular configuration, with said edge surfaces converging at an angle to one another.

15. An assembly for positioning a workpiece, such as a piece of mat board, by engagement of an edge thereof, including:

an angle guide device comprising: a body having a generally planar bottom surface portion and a lateral marginal portion with an edge surface thereon; a pair of arm members, each comprised of a mounting part and an abutment part having a contact surface portion thereon; and means cooperating with said mounting parts for mounting said arm members on said body with said abutment parts disposed outwardly of said marginal portion of said body, and with said contact surface portions thereon extending generally radially and in opposite directions therefrom; said body having projecting means disposed along said marginal portion and projecting downwardly beyond said bottom surface portion, said projecting means providing a plurality of interior surface elements contiguous to said bottom surface portion and spaced from one another along said marginal portion, said body also having a plurality of substantially identical circular apertures extending transversely therethrough, between said surface elements, and spaced laterally different distances from said projecting means;

a locking piece removably seated in one of said apertures and extending transversely through said body and rotatably mounted therein, said locking piece having a lug element positioned eccentrically with respect to the axis of rotation thereof, and disposed adjacent said bottom surface and projecting downwardly therebeyond; and an elongated guide member having a flat top surface, and rectilinear edge surfaces extending along opposite lateral margins thereof, said device thereby being adapted for securement in each of a multiplicity of positions along the longitudinal axis of said guide member by turning said locking piece within said aperture to bring said lug element thereof into tight engagement upon one of said rectilinear edge surfaces, and to thereby clamp said projecting means against the other of said edge surfaces.

16. The assembly of claim 15 wherein said guide member is of generally right-triangular configuration, with said edge surfaces converging at an angle to one another.

* * * * *